(12) United States Patent
Seder et al.

(10) Patent No.: US 11,833,901 B2
(45) Date of Patent: Dec. 5, 2023

(54) SYSTEM AND METHOD FOR ADJUSTING A LOCATION AND DISTORTION OF AN IMAGE PROJECTED ONTO A WINDSHIELD OF A VEHICLE BY A HEAD-UP DISPLAY

(71) Applicant: GM GLOBAL TECHNOLOGY OPERATIONS LLC, Detroit, MI (US)

(72) Inventors: Thomas A. Seder, Fraser, MI (US); Kai-Han Chang, Madison Heights, MI (US); Leslie G. Ferris, Clinton Township, MI (US); Guy N. Kennerly, Southfield, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 631 days.

(21) Appl. No.: 17/068,393

(22) Filed: Oct. 12, 2020

(65) Prior Publication Data

US 2022/0111728 A1    Apr. 14, 2022

(51) Int. Cl.
*B60K 35/00*    (2006.01)
*B60R 11/04*    (2006.01)

(52) U.S. Cl.
CPC .............. *B60K 35/00* (2013.01); *B60R 11/04* (2013.01); *B60K 2370/1529* (2019.05); *B60K 2370/31* (2019.05); *B60K 2370/334* (2019.05); *B60K 2370/73* (2019.05); *B60K 2370/785* (2019.05); *B60K 2370/92* (2019.05); *B60R 2300/105* (2013.01); *B60R 2300/402* (2013.01)

(58) Field of Classification Search
CPC ............ B60K 35/00; B60K 2370/1529; B60K 2370/31; B60K 2370/73; B60K 2370/92; B60K 2370/334; B60K 2370/785; B60R 11/04; B60R 2300/105; B60R 2300/402

USPC ........................................................... 701/36
See application file for complete search history.

(56) References Cited

U.S. PATENT DOCUMENTS

| | | | |
|---|---|---|---|
| 10,302,937 B2 | 5/2019 | Ferris et al. | |
| 10,747,314 B1 | 8/2020 | Chang et al. | |
| 2016/0109701 A1* | 4/2016 | Goldman-Shenhar | G02B 27/01 345/8 |
| 2017/0161949 A1 | 6/2017 | Seder et al. | |
| 2017/0161950 A1 | 6/2017 | Seder et al. | |
| 2019/0025580 A1* | 1/2019 | Nagano ................ | H04N 9/3194 |

(Continued)

OTHER PUBLICATIONS

U.S. Appl. No. 16/363,536, filed Mar. 25, 2019, Chang et al.

(Continued)

*Primary Examiner* — Mahmoud S Ismail

(57) ABSTRACT

A method includes placing a physical target on a windshield of a vehicle, mounting a fixture inside the vehicle to position a camera array on the fixture within a line of sight of a passenger, capturing images of the physical target using the camera array, and determining a difference between actual and target locations of the physical target in each image. In addition, the method includes controlling the HUD to display a virtual target on the windshield, capturing images of the virtual target using the camera array, and determining a target location of the virtual target in each image based on the difference. Further, the method includes determining an offset between an actual location of the virtual target in each image and the target location of the virtual target in each image, and adjusting the location of an image projected onto the windshield by the HUD based on the offset.

20 Claims, 12 Drawing Sheets

(56) References Cited

U.S. PATENT DOCUMENTS

| | | | |
|---|---|---|---|
| 2019/0339535 A1* | 11/2019 | Abi-Chaaya | G02B 27/0093 |
| 2020/0018976 A1* | 1/2020 | Van Wiemeersch | B60K 35/00 |
| 2020/0073138 A1 | 3/2020 | Chang | |
| 2020/0073139 A1 | 3/2020 | Chang | |

OTHER PUBLICATIONS

U.S. Appl. No. 16/379,439, filed Apr. 9, 2019, Chang et al.
U.S. Appl. No. 16/418,574, filed May 21, 2019, Chang et al.
U.S. Appl. No. 16/459,994, filed Jul. 2, 2019, Seder et al.
U.S. Appl. No. 16/531,744, filed Aug. 5, 2019, Chang et al.
U.S. Appl. No. 16/531,844, filed Aug. 5, 2019, Chang et al.
U.S. Appl. No. 16/549,606, filed Aug. 23, 2019, Chang et al.
U.S. Appl. No. 16/553,475, filed Aug. 28, 2019, Chang et al.
U.S. Appl. No. 16/560,035, filed Sep. 4, 2019, Chang et al.
U.S. Appl. No. 16/599,777, filed Oct. 11, 2019, Chang et al.
U.S. Appl. No. 16/661,227, filed Oct. 23, 2019, Chang et al.
U.S. Appl. No. 16/676,213, filed Nov. 6, 2019, Harden et al.
U.S. Appl. No. 16/676,769, filed Nov. 7, 2019, Chang et al.
U.S. Appl. No. 16/688,139, filed Nov. 19, 2019, Wells et al.
U.S. Appl. No. 16/711,271, filed Dec. 11, 2019, Chang et al.
U.S. Appl. No. 16/782,856, filed Feb. 5, 2020, Harden, Jr. et al.
U.S. Appl. No. 17/004,249, filed Aug. 27, 2020, Seder et al.

* cited by examiner

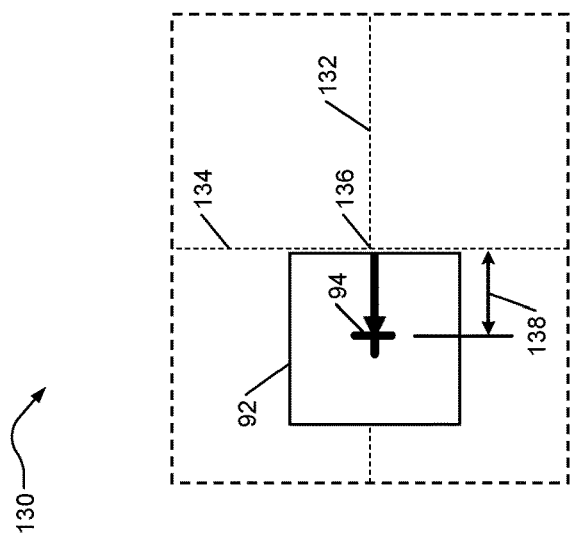
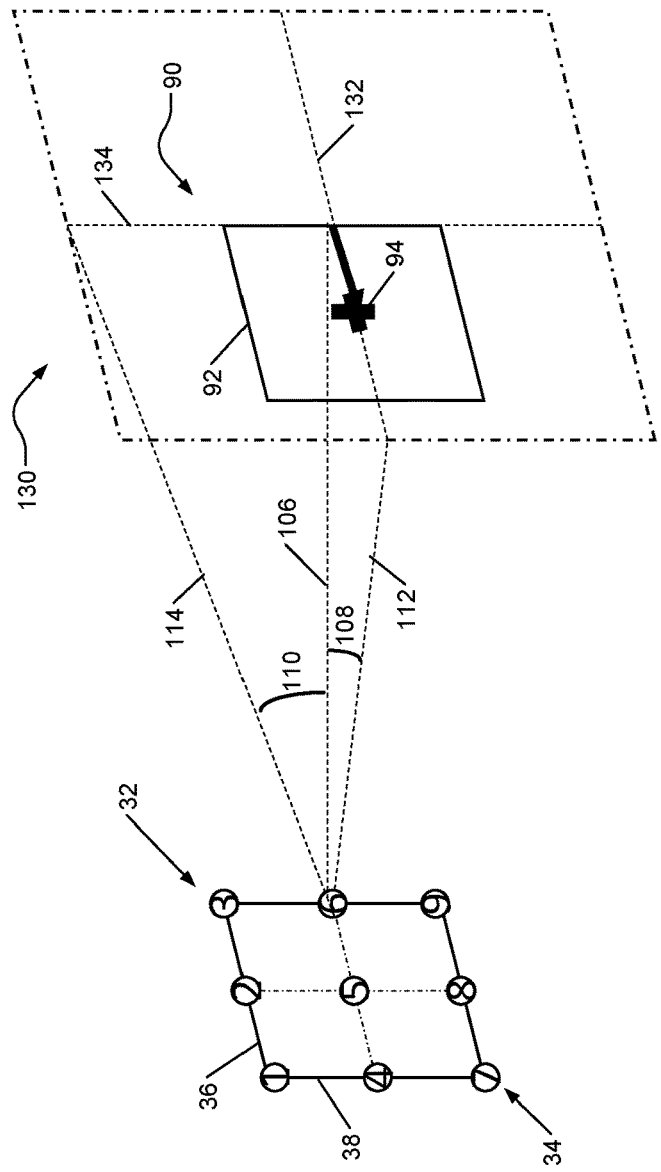
FIG. 11
FIG. 10

SYSTEM AND METHOD FOR ADJUSTING A LOCATION AND DISTORTION OF AN IMAGE PROJECTED ONTO A WINDSHIELD OF A VEHICLE BY A HEAD-UP DISPLAY

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to a system and method for adjusting a location and distortion of an image projected onto a windshield of a vehicle by a head-up display.

A head-up display (HUD) projects an image onto a windshield of the vehicle. The area of the windshield where the HUD projects the image is referred to as a HUD patch. When a HUD is initially installed in a vehicle, the HUD image is located at least partially outside of the HUD patch due to manufacturing tolerances of the mounting structure in the vehicle for the HUD and/or the HUD itself. In addition, the HUD image is typically distorted.

SUMMARY

An example of a method for adjusting a location of an image projected onto a windshield of a vehicle by a head-up display (HUD) is disclosed. The method includes placing a physical target on the windshield at a target location of the projected image, mounting a fixture to a component within a cabin of the vehicle to position an array of cameras attached to the fixture within a possible line of sight between eyes of a passenger of the vehicle and the target location of the projected image, capturing a first plurality of images of the physical target using the array of cameras, and determining at least one difference between an actual location of the physical target in each of the first plurality of images and a target location of the physical target in each of the first plurality of images. In addition, the method includes controlling the HUD to display a virtual target on the windshield at the target location of the projected image, capturing a second plurality of images of the virtual target using the array of cameras, and determining a target location of the virtual target in each of the second plurality of images based on the at least one difference. Further, the method includes determining at least one offset between an actual location of the virtual target in each of the second plurality of images and the target location of the virtual target in each of the second plurality of images, and adjusting the location of the image projected onto the windshield by the HUD based on the at least one offset.

In one aspect, the method further includes positioning a camera at a center of the array of cameras so that the physical target in an image captured by the camera is positioned at the target location of the physical target in the captured image.

In one aspect, the at least one difference includes a distance between a center of the physical target in each of the first plurality of images and a center of a corresponding image of the first plurality of images.

In one aspect, the at least one difference incudes the distance in two directions that are perpendicular to one another.

In one aspect, the method further includes determining at least one angle between an actual orientation of the fixture and a target orientation of the fixture, and determining the target location of the virtual target in each of the second plurality of images further based on the at least one angle.

In one aspect, the at least one angle includes an angle by which the fixture is rotated about an axis that extends through a center camera of the array of cameras and is perpendicular to a plane in which the array of cameras is disposed.

In one aspect, the at least one angle includes an angle by which the fixture is rotated about an axis that extends through at least two cameras of the array of cameras and is disposed within a plane in which the array of cameras is disposed.

In one aspect, the axis is parallel to at least one side of the fixture.

In one aspect, the at least one offset includes a distance between a center of the virtual target in each of the second plurality of images and a center of a corresponding image of the second plurality of images.

In one aspect, the at least one offset includes the distance in two directions that are perpendicular to one another.

In one aspect, the method further includes determining a target location of a center of the virtual target in each of the second plurality of images based on the at least one difference, and adjusting the location of the image projected by the HUD based on the at least one offset so that an actual location of the center of the virtual target in each of the second plurality of images is at the target location of the center of the virtual target.

In one aspect, each camera in the array of cameras captures one image in the first plurality of images and one image in the second plurality of images.

Another example of a method for adjusting a location of an image projected onto a windshield of a vehicle by a HUD is disclosed. The method includes placing a physical target on the windshield at a target location of the projected image, and mounting a fixture to at least one of a steering wheel and a steering column to position an array of cameras on the fixture within a possible line of sight between eyes of a driver of the vehicle and the target location of the projected image. One camera in the array of cameras is located at a center of the array of cameras. The method further includes positioning the one camera so that an actual location of the physical target in an image captured by the one camera is at a target location of the physical target in the captured image, capturing a first plurality of images of the physical target using the array of cameras, and determining a first distance between the actual location of the physical target in each of the first plurality of images and the target location of the physical target in each of the first plurality of images. The first distance is in a first direction. The method further includes determining a second distance between the actual location of the physical target in each of the first plurality of images and the target location of the physical target in each of the first plurality of images. The second distance is in a second direction that is perpendicular to the first direction. The method further includes controlling the HUD to display a virtual target on the windshield at the target location of the projected image, capturing a second plurality of images of the virtual target using the array of cameras, and determining a target location of the virtual target in each of the second plurality of images based on the first and second distances. The method further includes determining a first offset between an actual location of the virtual target in each of the second plurality of images and the target location of the virtual target in each of the second plurality of images. The first offset is in the first direction. The method further includes determining a second offset between the actual location of the virtual target in each of the second plurality of images and the target location of the virtual target in each of the second plurality of images. The second offset is in the second direction. The method further includes adjusting the location of the image projected onto the windshield by the HUD based on the first and second offsets.

In one aspect, the method further includes determining a first angle by which the fixture is rotated about an axis that extends through a center camera of the array of cameras and is perpendicular to a plane in which the array of cameras is disposed, determining a second angle by which the fixture is rotated about an axis that extends through at least two cameras of the array of cameras and is disposed within the plane in which the array of cameras is disposed, and determining the target location of the virtual target in each of the second plurality of images further based on first and second angles.

An example of a system for adjusting a location of an image projected onto a windshield of a vehicle by a HUD is disclosed. The system includes a camera control module, a camera misalignment module, a HUD misalignment module, and a HUD control module. The camera control module is configured to control an array of cameras disposed within a cabin of the vehicle to capture a first plurality of images of a physical target placed on the windshield at a target location of the projected image, and control the array of cameras to capture a second plurality of images of a virtual target displayed on the windshield using the array of cameras. The camera misalignment module is configured to determine at least one difference between an actual location of the physical target in each of the first plurality of images and a target location of the physical target in each of the first plurality of images. The HUD misalignment module is configured to determine a target location of the virtual target in each of the second plurality of images based on the at least one difference, and determine at least one offset between an actual location of the virtual target in each of the second plurality of images and the target location of the virtual target in each of the second plurality of images. The HUD control module is configured to control the HUD to display the virtual target on the windshield at the target location of the projected image, and adjust the location of the image projected onto the windshield by the HUD based on the at least one offset.

In one aspect, the system further includes the array of cameras, and a fixture to which the array of cameras is attached. The fixture is configured to be mounted to a component of the vehicle within the cabin to position the array of cameras within a possible line of sight between eyes of a passenger of the vehicle and the target location of the projected image on the windshield.

In one aspect, the at least one difference includes a distance between a center of the physical target in each of the first plurality of images and a center of a corresponding image of the first plurality of images.

In one aspect, the camera misalignment module is configured to determine at least one angle between an actual orientation of the array of cameras and a target orientation of the array of cameras, and the HUD misalignment module is configured to determine the target location of the virtual target in each of the second plurality of images based on the at least one angle.

In one aspect, the at least one offset includes a distance between a center of the virtual target in each of the second plurality of images and a center of a corresponding image of the second plurality of images.

In one aspect, the HUD control module is configured to determine a target location of a center of the virtual target in each of the second plurality of images based on the at least one difference, and adjust the location of the image projected by the HUD based on the at least one offset so that an actual location of the center of the virtual target in each of the second plurality of images is at the target location of the center of the virtual target.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 10 is a perspective view of the camera array and an image of the physical target captured by a middle right camera of the camera array;

FIG. 11 is a planar view of the image of FIG. 10;

In the drawings, reference numbers may be reused to identify similar and/or identical elements.

DETAILED DESCRIPTION

Figure 1:
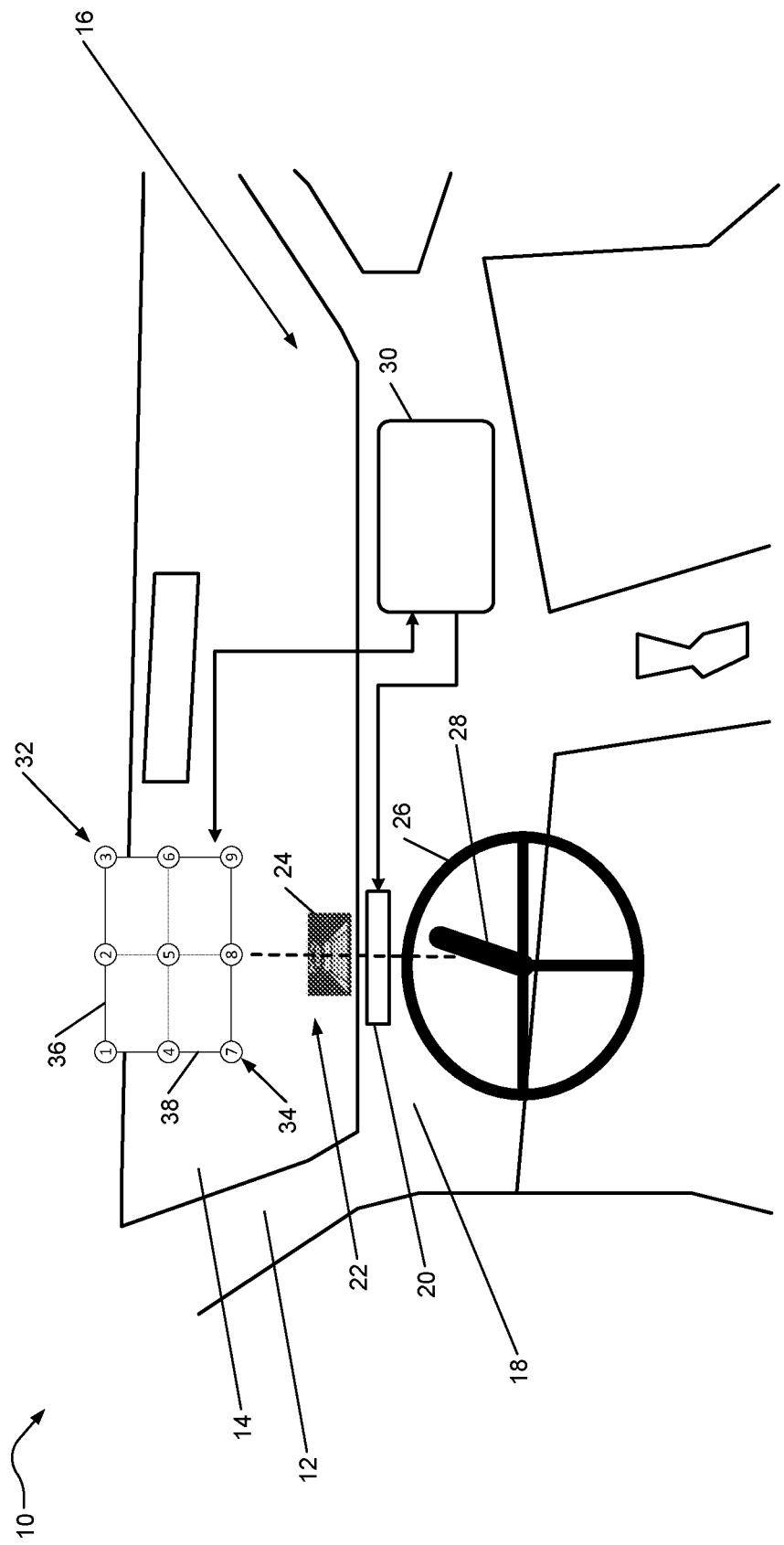
FIG. 1 is a perspective view of an example vehicle including a head-up display (HUD) for projecting images on a windshield of the vehicle, and an example camera fixture holding an example camera array according to the present disclosure.

During assembly of a vehicle, a calibration process may be performed to adjust the location and distortion of an image projected onto a windshield of the vehicle by a HUD. The calibration process ensures that the HUD image is projected in the HUD patch and corrects distortion of the HUD image. In one example, the calibration process involves using a robotic system to precisely locate a camera at various locations within an eyebox (i.e., a cross-section of a possible line of sight between the eyes of the driver and the HUD patch). At each location, the camera captures an image of a virtual target projected by the HUD such an array of dots. The images captured by the camera are used to determine the horizontal and vertical misalignments of various points on the virtual target in the HUD image relative to target locations of these points. Distortion compensation map(s) are developed based on the horizontal and vertical misalignments, and the location and distortion of the HUD image are adjusted using the distortion compensation map(s).

The HUD calibration process described above requires costly robotics to precisely locate the camera within the eyebox, and repositioning the camera at various locations in the eyebox increases the amount of time required to assemble the vehicle. In addition, if a HUD of a vehicle is replaced in service, it may not be feasible to adjust the location and distortion of the image projected by the HUD using the HUD calibration process described above since the robotics required to do so may not be available. For example, a vehicle dealership is unlikely to have robotic systems capable of precisely locating a camera at various positions in the eyebox to perform the HUD calibration process described above.

To address this issue, a method according to the present disclosure adjusts the location and distortion of an image projected by a HUD without the need to precisely locate a camera at various positions in the eyebox. Instead, the method involves mounting a fixture to a component in a cabin of the vehicle, such as a steering wheel and/or a steering column, to approximately locate a camera array on the fixture in the eyebox. A physical target, such as a sticker with a rectangle and a dot or crosshair at the center of the rectangle, is then placed in the HUD patch, and each camera in the camera array captures an image of the physical target.

The target location(s) of one or more points of the physical target in the image captured by each camera is determined based on spatial relationships between the cameras in the camera array, and between the camera array and the physical target. In addition, the field of view and/or angular misalignment of the cameras in the camera array may be used to determine the target location(s). In one example, the line of sights of the cameras in the camera array are parallel to each other, and the spatial relationships are known. The horizontal and vertical misalignment of the camera array from the center of the eyebox is then determined based on the distances between the target location(s) of the point(s) on the physical target and the actual location(s) of the point(s) in the HUD image.

The HUD is then controlled to display the virtual target on the windshield, and each camera in the camera array captures an image of the virtual target. The images captured by the cameras are used to determine the horizontal and vertical misalignments of various points on the virtual target in the HUD image relative to target locations of these points. The camera misalignment is accounted for when determining the target locations of these points. Distortion compensation map(s) are developed based on the horizontal and vertical misalignments, and the location and distortion of the HUD image is adjusted using the distortion compensation map(s).

Determining the misalignment of the camera array fixture and determining target locations of various points on the virtual target in the HUD image based on the camera misalignment enables the method to calibrate the HUD without precisely locating a camera array fixture. Thus, the method saves time on the production line relative to HUD calibration processes that require using a robotic system to precisely locate a camera at various locations in an eyebox. In addition, if a HUD of a vehicle is replaced in service, the method may be performed by a vehicle dealership to adjust the location and distortion of the image projected by the HUD.

Referring now to FIG. 1, a vehicle 10 in includes a body structure 12 and a windshield 14 that enclose a cabin 16 of the vehicle 10. In addition, the vehicle 10 includes a dashboard 18 mounted to the body structure 12, and a head-up display (HUD) 20 that projects an image 22 onto the windshield 14. The area of the windshield 14 where the HUD 20 projects the image 22 is referred to as a HUD patch 24. In FIG. 1, the HUD patch 24 is depicted as having a rectangular perimeter. Further, the vehicle 10 includes a steering wheel 26, a steering column 28, and a system control module 30. The steering column 28 connects the steering wheel 26 to a steering mechanism (not shown) of the vehicle 10.

The system control module 30 controls the HUD 20 to project images such as the image 22 onto the HUD patch 24 of the windshield 14. The images projected by the HUD 20 may include text, symbols, and/or gauges. The system control module 30 may control the content of the images to be projected by the HUD 20 and/or the location and distortion of the images to be projected by the HUD 20.

Figure 7:
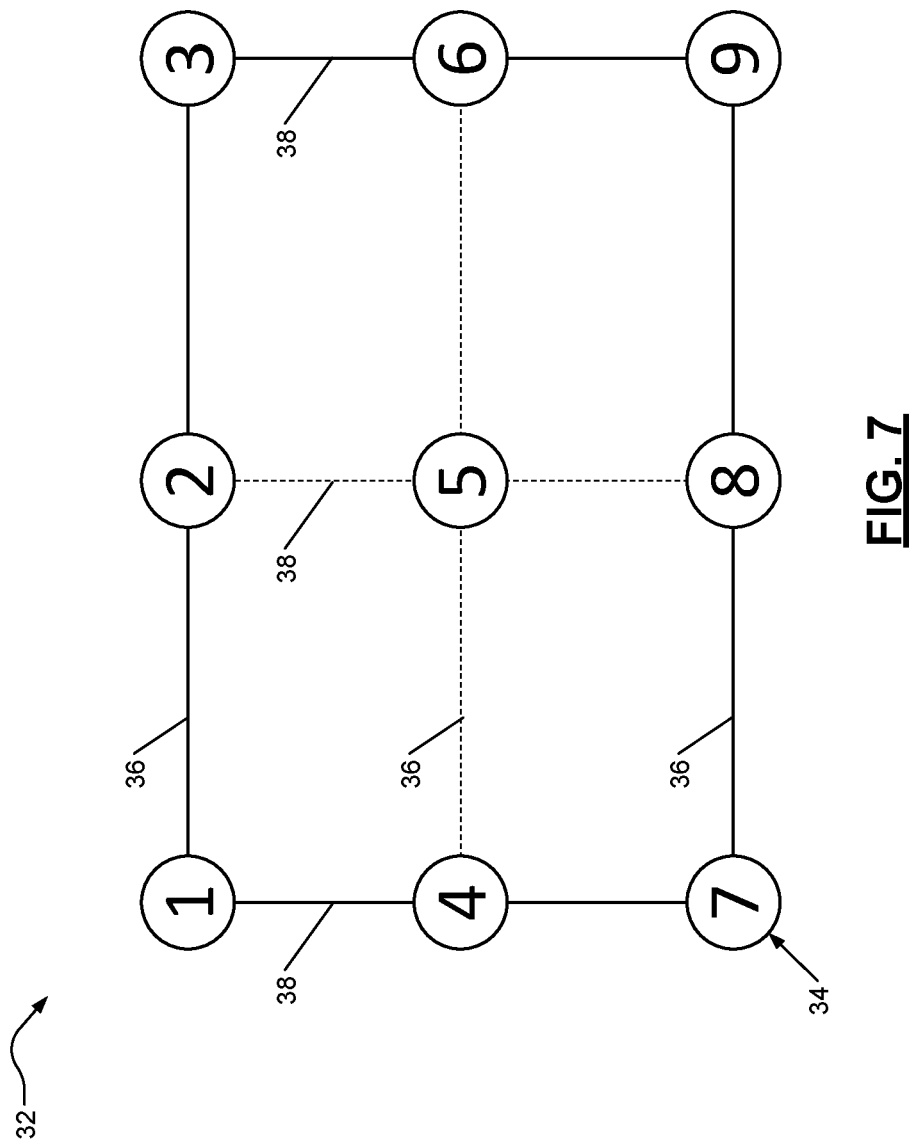
FIG. 7 is a planar view of the camera fixture and the camera array.

FIGS. 1 and 7 also illustrate a camera fixture 32 and a camera array 34. The camera fixture 32 and the camera array 34 may only be used to calibrate the image 22 projected by the HUD 20, and may not be part of the vehicle 10. In the example shown, the camera array 34 is a rectangular array of nine cameras. The nine cameras include an upper left camera 1, an upper middle camera 2, an upper right camera 3, a middle left camera 4, a center camera 5, a middle right camera 6, a lower left camera 7, a lower middle camera 8, and a lower right camera 9. In other examples, the camera array 34 may include additional or fewer cameras than nine. For example, cameras 2, 4, 6, and 8 may be omitted. Additionally or alternatively, the camera array 34 may be arranged in shapes other than a rectangle.

The camera fixture 32 includes horizontal braces 36 and vertical braces 38. The vertical and horizontal braces 36 and 38 collectively form or comprise a frame of the camera fixture 32. The cameras in the camera array 34 are attached to the camera fixture 32 using, for example, fasteners that secure the cameras to the vertical and horizontal braces 36 and 38 of the camera fixture 32. The camera fixture 32 may be mounted to the steering wheel 26 and/or the steering column 28 using, for example, mounting arms (not shown). Each mounting arm may include a collar at a distal end thereof that is configured to receive a segment of the steering wheel 26 or the steering column 28 and to be tightened around the steering wheel 26 or the steering column 28. The mounting arms may be part of the camera fixture 32.

FIG. 1 shows the camera array 34 spaced above the steering wheel 26 and the steering column 28 by a significant distance. When the camera array 34 is mounted to the steering wheel 26 and/or the steering column 28, the distance by which the camera array 34 is spaced above the steering wheel 26 and the steering column 28 would likely be less than that depicted in FIG. 1. In one example, when the camera fixture 32 mounts the camera array 34 to the steering wheel 26 and the steering column 28, the camera array 34 is positioned within a possible line of sight between the eyes of a driver of the vehicle 10 and the HUD patch 24. A cross section of this possible line of sight may be referred to as an eyebox, the camera fixture 32 may be adjustable to position the camera array 34 within the eyebox, and the size of the camera array 34 may be equal to the size of the eyebox. The ideal positioning of the camera array 34 is to align camera 5 to the center of the eyebox.

A calibration process may be performed to adjust the location and distortion of images projected by the HUD 20. During the calibration process, the system control module 30 controls the cameras of the camera array 34 to capture images of a physical target 90 (FIG. 4) placed on the HUD patch 24 of the windshield 14. The system control module 30 characterizes the misalignment of each camera in the camera array 34 based on the position of the physical target in each image relative to a target position. The system control module 30 then controls the HUD 20 to project an image of a virtual target 150 (FIG. 17) on the HUD patch 24 of the windshield 14, and controls the cameras of the camera array 34 to capture images of the virtual target 150. The system control module 30 characterizes the misalignment of the HUD 20, or the image projected by the HUD 20, based on (i) the position of the virtual target 150 in each image relative to a target position, and (ii) the camera misalignments. The system control module 30 then adjusts the location and distortion of images projected by the HUD 20 to correct for the HUD misalignment.

Figure 4:
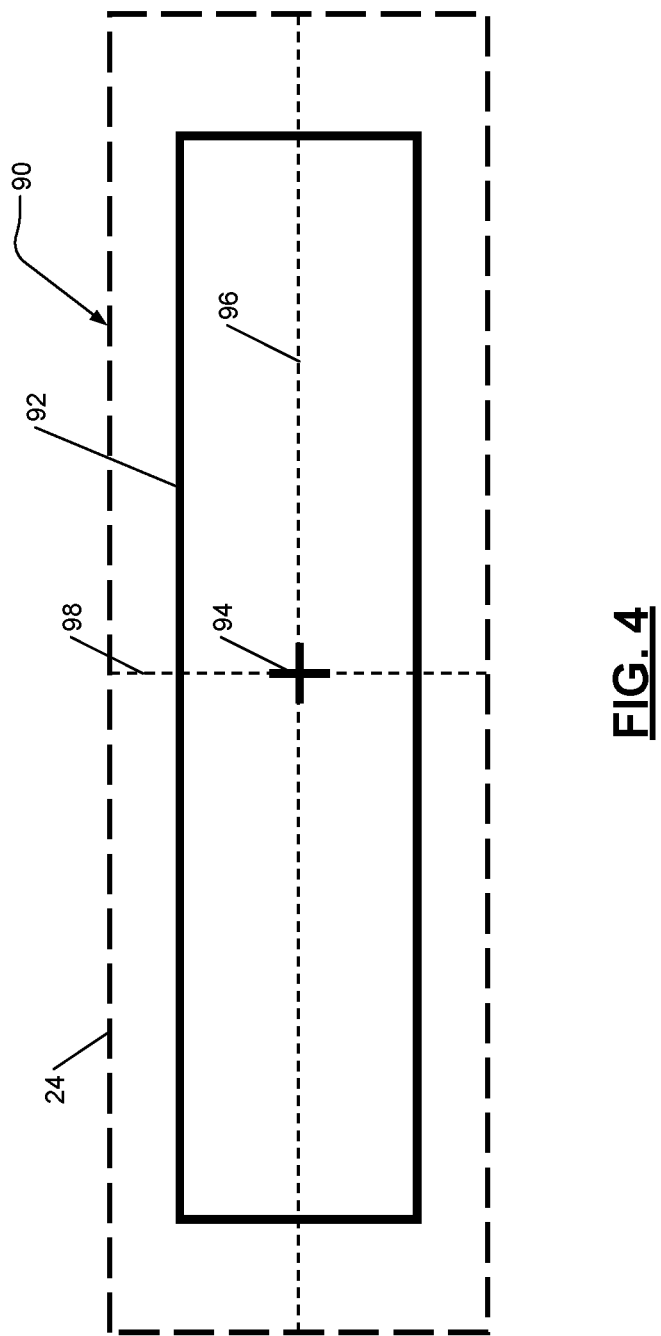
FIG. 4 is a planar view of an example physical target for placement onto the windshield of the vehicle according to the present disclosure.

Referring now to FIG. 4, an example of the physical target 90 includes a rectangle 92, a crosshair 94, a horizontal centerline 96, and a vertical centerline 98. The physical target 90 may be a sticker that is clear except for the rectangle 92, the crosshair 94, the horizontal centerline 96, and the vertical centerline 98. The physical target 90 may be sized and shaped to cover the entire HUD patch 24.

Figure 17:
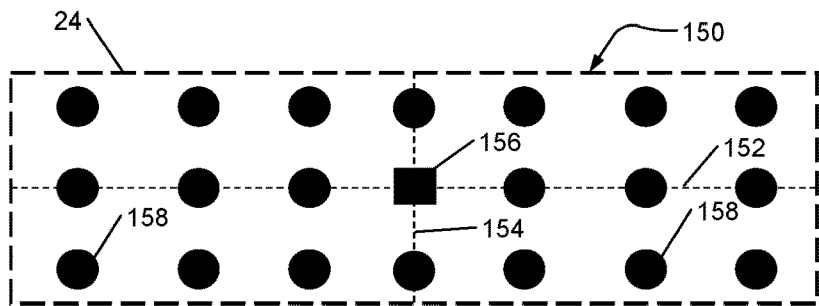
FIG. 17 is a planar view of a virtual target for projection onto the windshield of the vehicle according to the present disclosure.

Referring now to FIG. 17, an example of the virtual target 150 includes a horizontal centerline 152, and a vertical centerline 154, a center square 156 at the intersection of the horizontal and vertical centerlines 152 and 154, and an array or grid of circular dots 158. The center square 156 and the circular dots 158 may be referred to as points. The points may be spaced apart from one another at regular intervals along the horizontal and vertical centerlines 152 and 154 as shown. While the virtual target 150 depicted in FIG. 17 includes twenty-one points, the number of points included in the virtual target 150 may be greater than or less than twenty-one. For example, the virtual target may include twenty-seven points. The virtual target 150 may be sized and shaped to cover the entire HUD patch 24.

Figure 2:
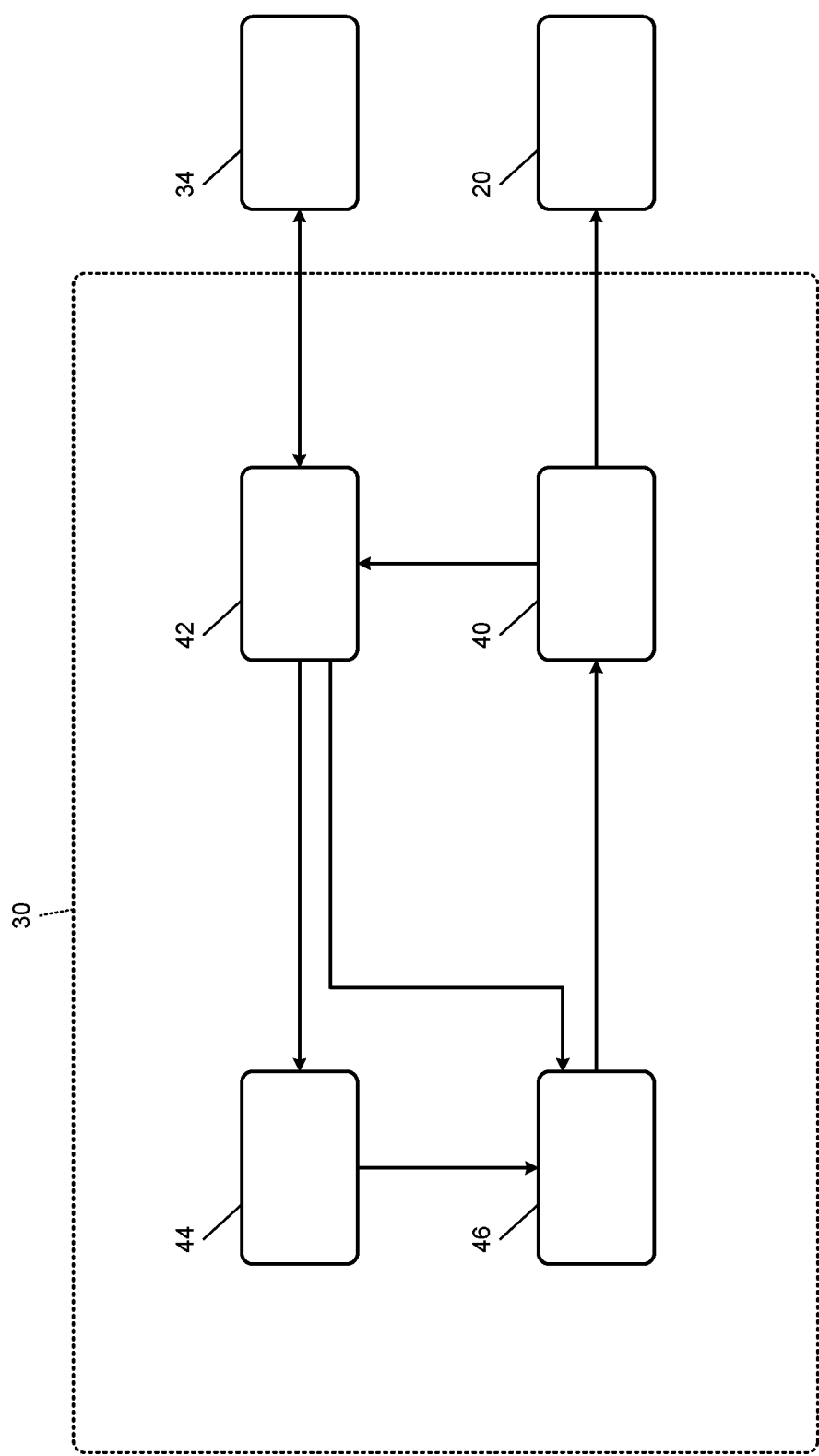
FIG. 2 is a functional block diagram of an example system control module for controlling the HUD and the camera array to adjust a location and distortion of an image projected by the HUD according to the present disclosure.

Referring now to FIG. 2, an example implementation of the system control module 30 includes a HUD control module 40, a camera control module 42, a camera misalignment module 44, and a HUD misalignment module 46. The HUD control module 40 controls the HUD 20 to project images such as the image 22 onto the HUD patch 24 of the windshield 14. The HUD control module 40 controls the content, location, and distortion of the images projected by the HUD 20. In addition, the HUD control module 40 stores the virtual target 150 and, during the calibration process, controls the HUD 20 to project an image of the virtual target 150 (FIG. 17). The HUD control module 40 outputs a signal to the camera control module 42 indicating when the HUD 20 is projecting the image of the virtual target 150.

The camera control module 42 controls the cameras in the camera array 34 to capture images. During the calibration process, the camera control module 42 controls each camera in the camera array 34 to capture an image of the physical target 90 when the physical target 90 is placed on the HUD patch 24. The camera control module 42 may determine when the physical target 90 is placed on the HUD patch 24 based on an input from a user interface device (not shown), which may be part of the vehicle 10 or the camera fixture 32. The camera control module 42 outputs the images of the physical target 90 to the camera misalignment module 44.

In addition, during the calibration process, the camera control module 42 controls each camera in the camera array 34 to capture an image of the virtual target 150 when the virtual target 150 is displayed on the HUD patch 24. The camera control module 42 may determine when the virtual target 150 is displayed on the HUD patch 24 based on an input from the HUD control module 40 (e.g., the signal output by the HUD control module 40). The camera control module 42 outputs the images of the virtual target 150 to the HUD misalignment module 46.

The camera misalignment module 44 characterizes the misalignment of each camera in the camera array 34 based on the position of the physical target in the image captured by the respective camera of the camera array 34 relative to a target position. In one example, the camera misalignment module 44 determines the horizontal and vertical distances between the center of the physical target 90 in the image captured by each camera of the camera array 34 and the center of the image. The center of the image may be at a predetermined pixel location (e.g., the location of the pixel at the midpoint of the width of the image and the midpoint of the height of the image). The camera misalignment module 44 may determine the pixel location of the center of the physical target 90 in the captured image by identifying the pixel location where the two lines of the crosshair 94 intersect one another. The camera misalignment module 44 outputs parameters, such as the horizontal and vertical distances, which indicate the misalignment of the camera array 34 from the expected position in the eyebox.

The HUD misalignment module 46 characterizes the misalignment of the HUD 20, or the image projected by the HUD 20, based on (i) the position of the virtual target 150 in each image relative to a target position, and (ii) the camera misalignments. In one example, the camera misalignment module 44 determines the horizontal and vertical offsets between the center of the virtual target 150 in the image captured by each camera of the camera array 34 and the center of the image. The HUD misalignment module 46 may determine the pixel location of the center of the virtual target 150 in the captured image by identifying the location of the pixel at the center of the center square 156. The HUD misalignment module 46 outputs parameters, such as the horizontal and vertical offsets, which indicate the misalignment of the HUD 20, or the image projected by the HUD 20.

Figure 3:
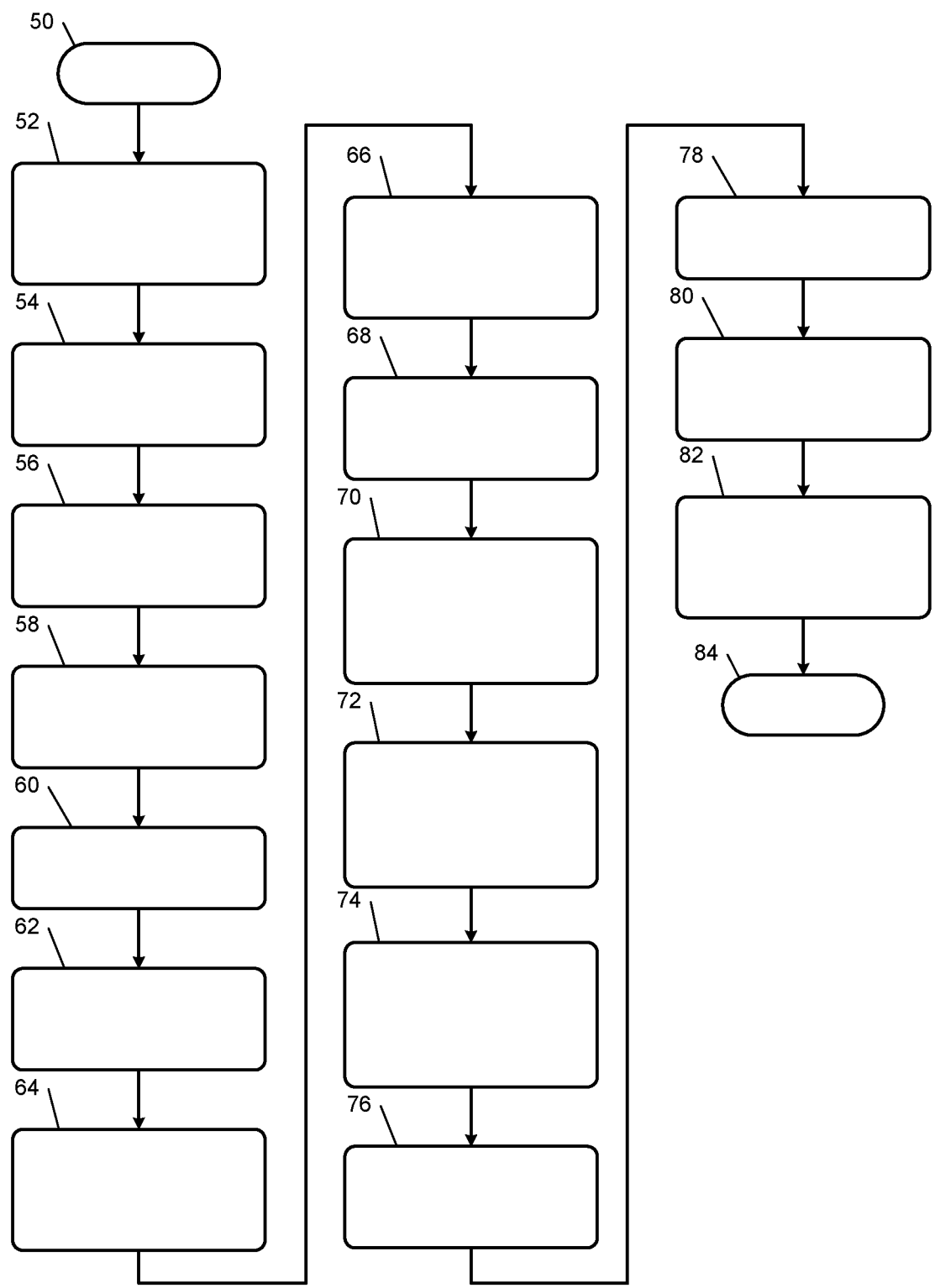
FIG. 3 is a flowchart illustrating an example method for adjusting a location and distortion of an image projected by the HUD according to the present disclosure.

Referring now to FIG. 3, an example method for adjusting the location and distortion of images projected by the HUD 20 onto the windshield 14 of the vehicle 10 begins at 50. The method is described in the context of the modules of FIG. 2. However, the particular modules that perform the steps of the method may be different than the modules mentioned below and/or one or more steps of the method may be implemented apart from the modules of FIG. 2.

At 52, a person or a robotic arm places the physical target 90 on the windshield 14 at a target location of images projected by the HUD 20 (e.g., at the HUD patch 24). In one example, the physical target 90 is part of a larger overlay having an outer perimeter that is sized and shaped to match the outer perimeter of the windshield 14 and that adheres to the windshield 14 when placed onto the windshield 14. Thus, when the overlay is placed onto the windshield 14 so that the outer perimeter of the overlay aligns with the outer perimeter of the windshield 14, the physical target 90 is located in the HUD patch 24.

At 54, a person or a robotic arm lowers and extends the steering column 28 to the maximum extent possible. This ensures that the steering column 28 is in a known position during the calibration process. In one example, the camera fixture 32 is designed so that, when the steering column 28 is in the known position and the camera fixture 32 is mounted to the steering wheel 26 and the steering column 28, the camera array 34 is located in the eyebox. The ideal positioning of the camera array 34 is to align camera 5 to the center of the eyebox.

At 56, a person or a robotic arm mounts the camera fixture 32 to the steering wheel 26 and the steering column 28. When doing so, the person or the robotic arm may position the camera array 34 within a possible line of sight between the eyes of the driver of the vehicle 10 and the HUD patch 24 (e.g., in the eyebox). However, the cameras in the camera array 34 do not need to be precisely located in the eyebox since the method accounts for the misalignment of the cameras when assessing and correcting the location and distortion of images projected by the HUD 20.

At 58, a person or a robotic arm connects the camera array 34 to an on-board diagnostics (OBD) port (not shown) of the vehicle 10. In one example, the camera array 34 includes a cable that, when connected to the OBD port of the vehicle 10, supplies power to the cameras of the camera array 34 and transmits images captured by the cameras to the camera control module 42. In addition, when the camera array 34 is connected to the OBD port of the vehicle 10, the HUD control module 40 may place the HUD 20 in a calibration mode.

Figure 6:
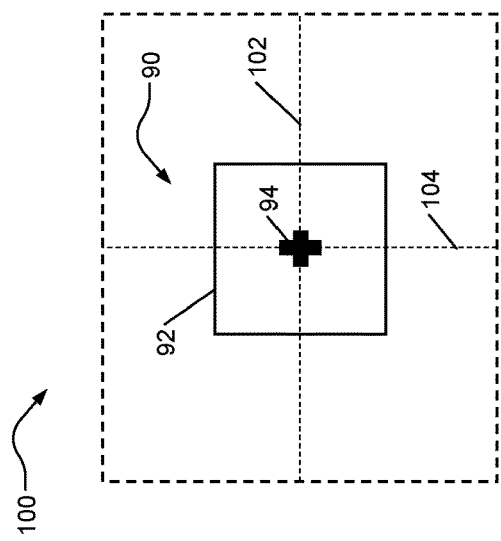
FIG. 6 is a planar view of the image of FIG. 5.
Figure 5:
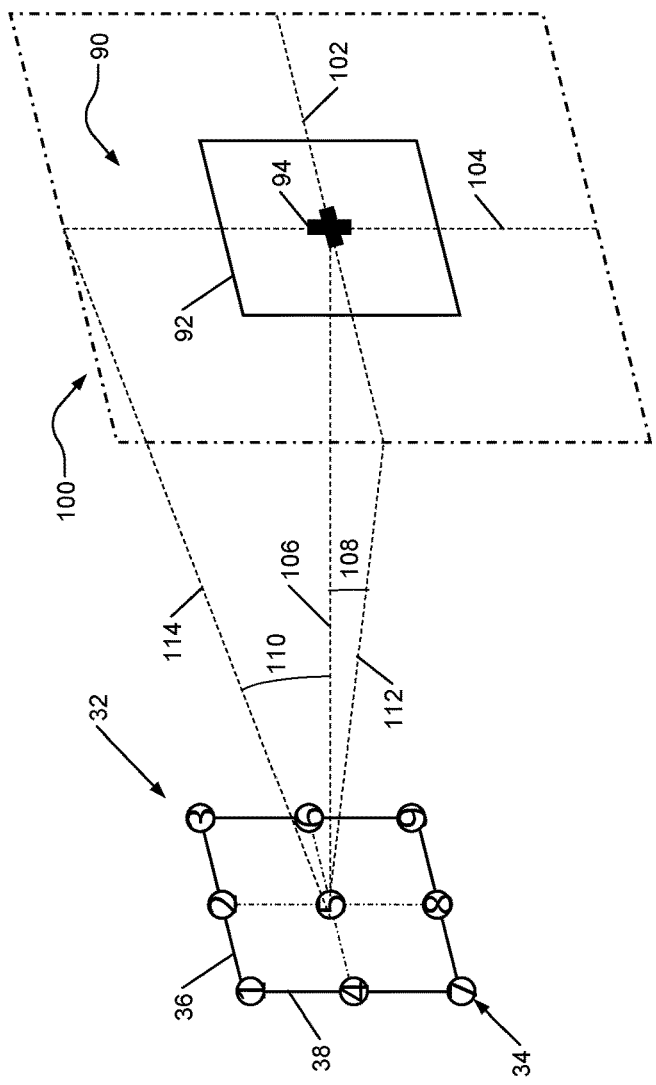
FIG. 5 is a perspective view of the camera array and an image of the physical target captured by a center camera of the camera array.

At 60, a person or a robotic arm manually aligns the center camera 5 of the camera array 34 with the physical target 90. For example, referring briefly to FIGS. 5 and 6, while the center camera 5 captures an image 100 of the physical target 90, the camera fixture 32 may be repositioned until the center of the physical target 90 in the image 100 is located at the center of the image 100. The center of the physical target 90 may be the location where the two lines of the crosshair 94 intersect with one another. The center of the image 100 may be the location where a horizontal centerline 102 of the image 100 intersects a vertical centerline 104 of the image 100.

The dimension of the image 100 along the horizontal centerline 102 is its width, and the dimension of the image 100 along the vertical centerline 104 is its height. The image 100 denotes the area range that can be captured onto the pixels of a camera. Each camera in the camera array 34 has a central line of sight 106 and a field of view characterized by an angle 108 and an angle 110. The angle 108 is an angle $\theta x$ between the central sight line 106 and an outermost sight line 112 in the horizontal direction (i.e., the direction along the horizontal centerline 102). The angle 110 is an angle $\theta y$ between the central sight line 106 and an outermost sight line 114 in the vertical direction (i.e., the direction along the vertical centerline 104).

The image 100 may be captured by a camera with M pixels along its width and N pixels along its height, where M and N are integers greater than one. Thus, the total number of pixels in the image 100 may be equal to a product of M and N, and the center of the image 100 may be at the $(M/2)^{th}$ pixel in the horizontal direction and the $(N/2)^{th}$ pixel in the vertical direction. In addition, if center camera 5 is located at a distance D from the physical target 90, the width of the image 100 corresponds to a distance of $2D \tan \theta x$, and the height of the image 100 corresponds to a distance of $2D \tan \theta y$.

Referring again to FIG. 3, at 62, the camera control module 42 controls each camera in the camera array 34 to capture an image of the physical target 90. For example, if the camera array 34 includes nine cameras as shown in FIGS. 1 and 7, the camera array 34 captures nine images of the physical target 90, with each camera in the camera array 34 capturing one of the nine images.

At 64, the camera misalignment module 44 calculates parameters (e.g., $\Delta x$, $\Delta y$, $\Delta \theta$, and $\Delta \varphi$) to characterize the misalignment of the camera fixture 32 and/or the camera array 34. For each camera in the camera array 34, the camera misalignment module 44 calculates a distance between an actual location of the physical target 90 in the image captured by the camera and a target location of the physical target 90 in the image. The target location of the physical target 90 in the image captured by the center camera 5 may be at the center of the image. The target location of the physical target 90 in the image captured by each of the other cameras in the camera array 34 may be determined based on the spatial relationships between the cameras and the physical target 90 and the field of view of the cameras.

Figure 9:
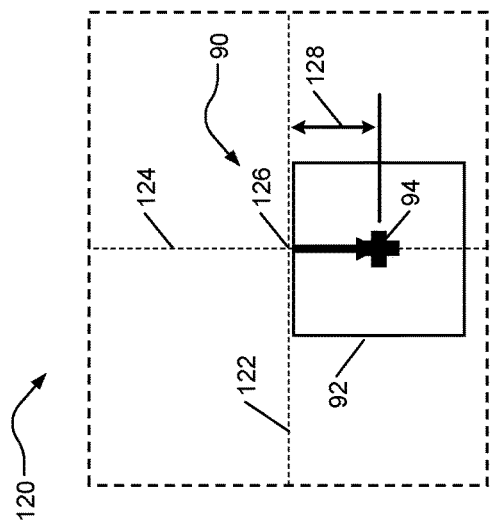
FIG. 9 is a planar view of the image of FIG. 8.
Figure 8:
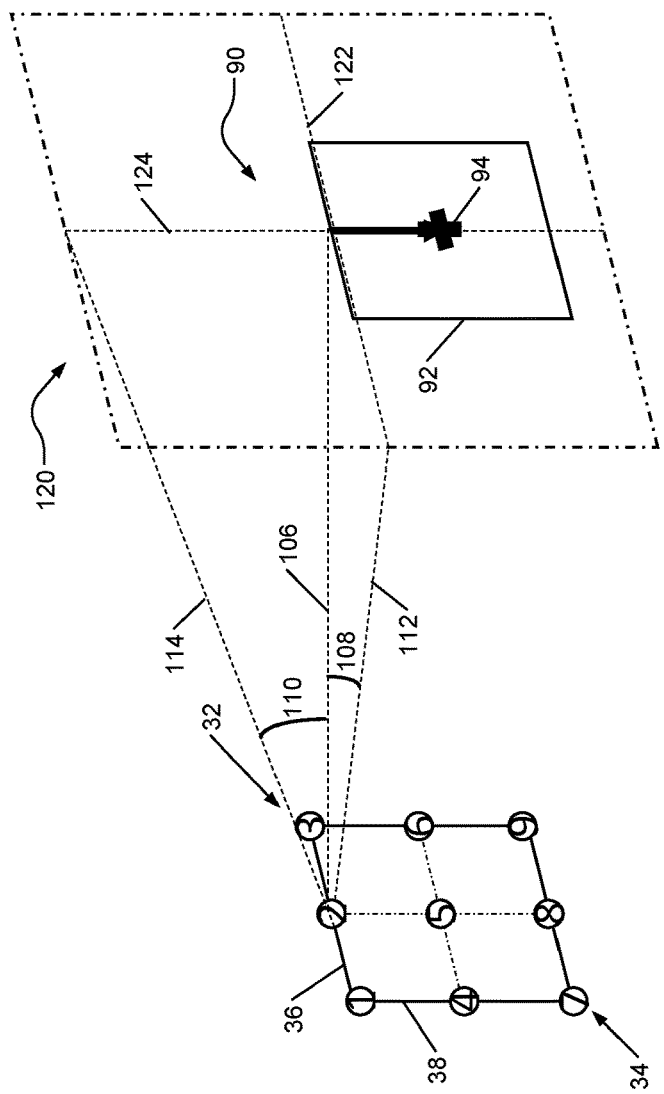
FIG. 8 is a perspective view of the camera array and an image of the physical target captured by an upper middle camera of the camera array.

In one example, referring briefly to FIGS. 8 and 9, the upper middle camera 2 may capture an image 120 of the physical target 90, and the image 120 may have a horizontal centerline 122 and a vertical centerline 124. Since the upper middle camera 2 is located above the center camera 5, the center of the physical target 90 in the image 120 may be shifted downward relative to a center 126 of the image 120 as shown. Thus, the camera misalignment module 44 may determine a vertical distance 128 between the center of the physical target 90 in the image 120 and the center 126 of the image 120. The camera misalignment module 44 may determine the vertical distance 128 using a relationship such as $$dn = \frac{-dy}{2D\tan\theta_y} N, \qquad (1)$$

where do is the vertical distance 128, dy is the vertical distance between cameras 2 and 5, D is the distance between the camera array 34 and the physical target 90, $\theta y$ is the field-of-view angle 110, and N is the number of pixels in the image 120 along the height of the image 120.

In another example, referring briefly to FIGS. 10 and 11, the middle right camera 6 may capture an image 130 of the physical target 90, and the image 130 may have a horizontal centerline 132 and a vertical centerline 134. Since the middle right camera 6 is located to the right of the center camera 5, the center of the physical target 90 in the image 130 may be shifted to the left relative to a center 136 of the image 130 as shown. Thus, the camera misalignment module 44 may determine a horizontal distance 138 between the center of the physical target 90 in the image 130 and the center 136 of the image 130. The camera misalignment module 44 may determine the horizontal distance 138 using a relationship such as $$dm = \frac{-dx}{2D\tan\theta_x}M, \quad (2)$$

where dm is the horizontal distance 138, dx is the horizontal distance between cameras 5 and 6, D is the distance between the camera array 34 and the physical target 90, θx is the field-of-view angle 108, and M is the number of pixels in the image 120 along the width of the image 120.

Referring again to FIG. 7, the camera misalignment module 44 may use relationships such as (1) and (2) to determine where any given point in the image captured by center camera 5 should be in the images captured by the other cameras in the camera array 34. In one example, the cameras in the camera array 34 are spaced apart from one another by the horizontal and vertical distances dx and dy, and a point in the image captured by the center camera 5 is at a coordinate (m, n). Thus, the upper left camera 1 is at a coordinate (−dx, dy), the upper middle camera 2 is at a coordinate (0, dy), the upper right camera 3 is at a coordinate (dx, dy), the middle left camera 4 is at a coordinate (−dx, 0), the middle right camera 6 is at a coordinate (0, dy), the lower left camera 7 is at a coordinate (−dx, −dy), the lower middle camera 8 is at a coordinate (0, −dy), and the lower right camera 9 is at a coordinate (dx, −dy). In addition, the same point in the image captured by the upper left camera 1 is at a coordinate $$\left(m + \frac{dx}{2D\tan\theta_x}M, \; n + \frac{-dy}{2D\tan\theta_y}N\right),$$

the same point in the image captured by the upper middle camera 2 is at a coordinate $$\left(m, \; n + \frac{-dy}{2D\tan\theta_y}N\right),$$

the same point in the image captured by the middle left camera 4 is at a coordinate $$\left(m + \frac{dx}{2D\tan\theta_x}M, \; n\right),$$

the same point in the image captured by the middle right camera 6 is at a coordinate $$\left(m + \frac{-dx}{2D\tan\theta_x}M, \; n\right)$$

the same point in the image captured by the lower left camera 7 is at a coordinate $$\left(m + \frac{dx}{2D\tan\theta_x}M, \; n + \frac{dy}{2D\tan\theta_y}N\right),$$

the same point in the image captured by the lower middle camera 8 is at a coordinate $$\left(m, \; n + \frac{dy}{2D\tan\theta_y}N\right),$$

and the same point in the image captured by the lower right camera 9 is at a coordinate $$\left(m + \frac{-dx}{2D\tan\theta_x}M, \; n + \frac{dy}{2D\tan\theta_y}N\right).$$

The coordinates in the example described above assume that the cameras in the camera array 34 are precisely spaced apart from one another by the vertical and horizontal distances dx and dy. Thus, for any point in the image captured by the center camera 5 having a coordinate (m, n), the coordinate of the same point in each of the other images as set forth above represents the target location of the same point in the other images. For example, the target location of the same point in the image captured by the upper left camera 1 is at a coordinate $$\left(m + \frac{dx}{2D\tan\theta_x}M, \; n + \frac{-dy}{2D\tan\theta_y}N\right).$$

However, the actual location of the same point may appear at $$\left(m + \frac{dx}{2D\tan\theta_x}M + \Delta x, \; n + \frac{-dy}{2D\tan\theta_y}N + \Delta y\right),$$

where Δx and Δy are the horizontal and vertical distances between the actual and target locations of the point in the image, due to camera array misalignment from the center of the eyebox. The camera misalignment module 44 may determine Δx and Δy for one or more points on the physical target 90 (e.g., the center thereof) to characterize the horizontal and vertical misalignment of the camera array 34 from the center of eyebox.

The camera misalignment module 44 may also calculate parameters to characterize the angular misalignment of the camera fixture 32 and/or the camera array 34. For example, the camera misalignment module 44 may determine an angle between an actual orientation of the camera fixture 32 and/or the camera array 34 and a target orientation of the camera fixture 32 and/or the camera array 34. The camera misalignment module 44 may then determine the target location of a point on the physical target 90 in the image captured by each camera in the camera array 34 based on the angle, and determine the horizontal and vertical distances between the target location of the point and an actual location of the point.

Figure 12:
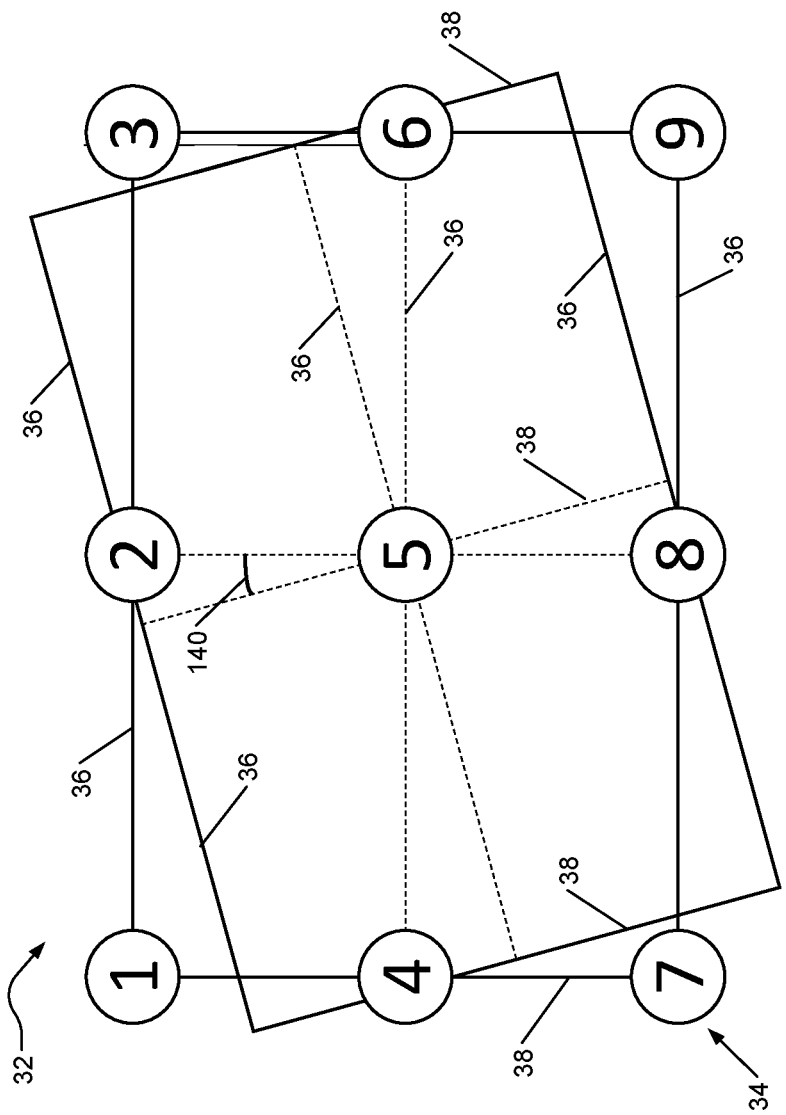
FIG. 12 is a planar view of images captured by the camera located in the center of the camera array when the camera fixture is oriented properly and when the camera fixture is rotated about the center camera.

In one example, referring briefly to FIG. 12, the camera fixture 32 may be rotated counterclockwise by an angle 140 about an axis extending through the center camera 5 and perpendicular to the plane of the camera array 34 (e.g., perpendicular to the page) due to installation error. Due to this rotation, the coordinate of a point in the image captured by the center camera 5 may change from (m, n) to (m', n'), where $$\begin{bmatrix} m' \\ n' \end{bmatrix} = \begin{bmatrix} \cos\theta & \sin\theta \\ -\sin\theta & \cos\theta \end{bmatrix} \begin{bmatrix} m \\ n \end{bmatrix}, \quad (3)$$

and θ is the angle 140. The camera misalignment module 44 may determine the angle 140 based on the orientation of one or more edges of the physical target 90 in one or more of the images captured by the cameras in the camera array 34. For example, the camera misalignment module 44 may assume that the angle 140 is equal to the angle between a horizontal line of the physical target 90 in the image captured by the center camera 5 and a horizontal edge of the image.

In addition, the new coordinate of the same point in the image captured by the middle right camera 6 may be determined using the following relationship:

$$\begin{bmatrix} \cos\theta & -\sin\theta \\ \sin\theta & \cos\theta \end{bmatrix} \begin{bmatrix} dx \\ 0 \end{bmatrix} = \begin{bmatrix} dx\cos\theta \\ dx\sin\theta \end{bmatrix}, \quad (4)$$

where dx is the distance between the center camera 5 and the middle right camera 6 along the horizontal brace 36 connecting the cameras 5, 6 to one another. If the field of view of the center camera 5 is straight, the field of view of the middle right camera 6 is straight, and the center of the image captured by the center camera 5 was at a coordinate (m, n), the coordinate of the same point in the image captured by the middle right camera 6 would be $$\left( m + \frac{-dx\cos\theta}{2D\tan\theta_x} M, n + \frac{-dx\cos\theta}{2D\tan\theta_y} N \right).$$

However, the middle right camera 6 is actually rotated by the angle 140 (i.e., by θ). Therefore, the coordinate (m', n') of the same point in the image captured by the middle right camera 6 may be determined using the following relationship:

$$\begin{bmatrix} m' \\ n' \end{bmatrix}_{camera\ 6} = \begin{bmatrix} \cos\theta & -\sin\theta \\ \sin\theta & \cos\theta \end{bmatrix} \begin{bmatrix} x\cos\theta \\ dx\sin\theta \end{bmatrix}. \quad (5)$$

The coordinates in the example described above assume that the cameras in the camera array 34 are precisely spaced apart from one another by the vertical and horizontal distances dx and dy. Thus, for any point in the image captured by the center camera 5 having a coordinate (m', n'), the coordinate of the same point set forth above for each of the other images represents the target location of the same point in the other images. For example, the target location of the same point in the image captured by the middle right camera 6 is at the coordinate defined by relationship (5). However, the actual and target locations of the same point in the image captured by the middle right camera 6 may differ by horizontal and vertical distances Δx and Δy. The camera misalignment module 44 may determine Δx and Δy for one or more points on the physical target 90 (e.g., the center thereof) to characterize the horizontal and vertical misalignment of each camera in the camera array 34.

Figure 14:
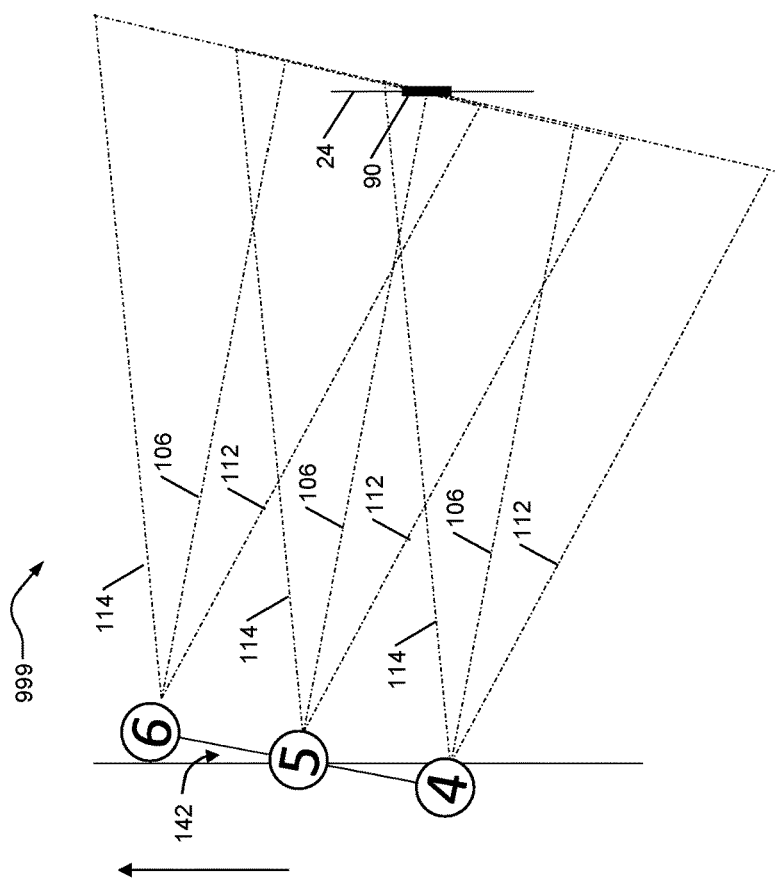
FIG. 14 is a side view of the camera fixture rotate about the axis of FIG. 13.
Figure 13:
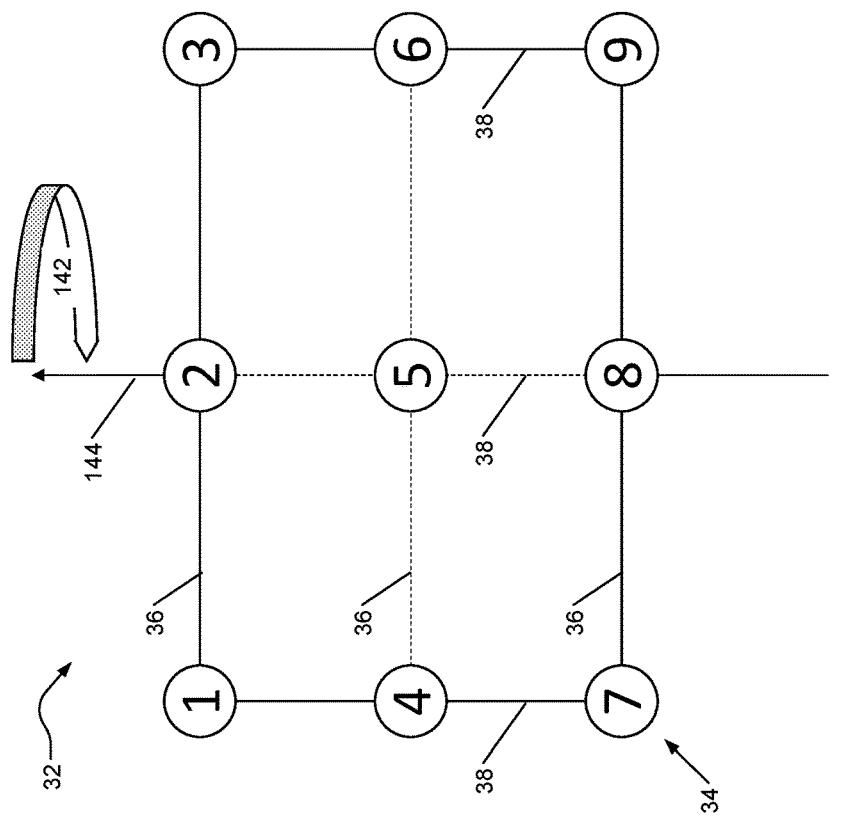
FIG. 13 is a planar view of the camera fixture illustrating an axis about which the camera fixture may be rotated.

In another example, referring briefly to FIGS. 13 and 14, the camera fixture 32 may be rotated by an angle 142 about an axis 144 extending through the cameras 2, 5, 8 and disposed within the plane of the camera array 34 due to imprecise alignment of the camera fixture/array 32/34 as shown in FIG. 13. In addition, if the camera fixture 32 is rotated by the angle 142 about the axis 144 and still aims the center camera 5 at the physical target 90, the camera fixture 32 will also be rotated by the angle 142 about an axis extending through the center camera 5 and disposed within the plane of the camera array 34 as shown in FIG. 14. The camera misalignment module 44 may determine the angle 146 based on the size and/or shape of the physical target 90 in one or more of the images captured by the cameras in the camera array 34. As a result of the angular misalignment of the camera fixture 32 shown in FIGS. 13 and 14, the images captured by the cameras 1, 4, 7 have an opposite depth change relative to the images captured by the cameras 3, 6, 9. In addition, a target size change in the horizontal direction x of the image captured by the center camera 5 is equal to $$(\text{target size}(x) * \cos\varphi_y) * \frac{M}{2D\tan\theta_x}, \quad (6)$$

where $\varphi_y$ is the angle 142.

Figure 16:
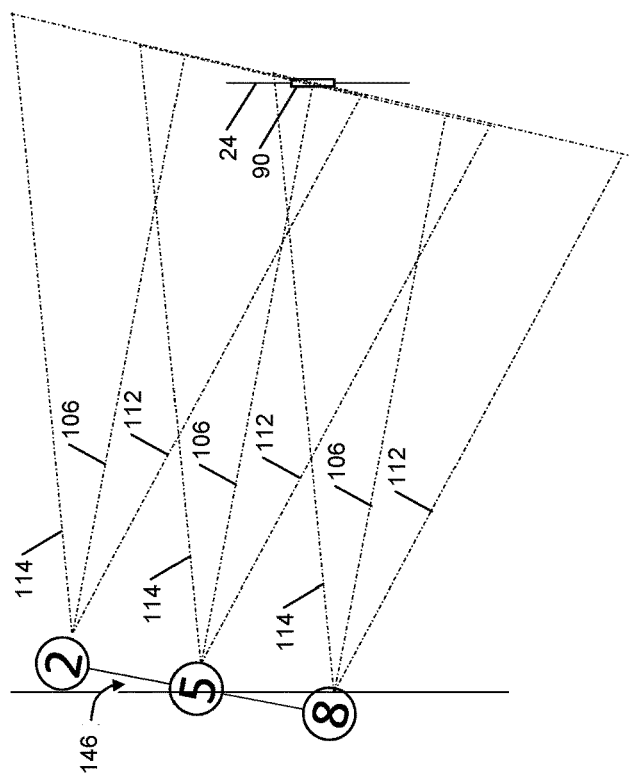
FIG. 16 is a side view of the camera fixture rotate about the axis of FIG. 15.
Figure 15:
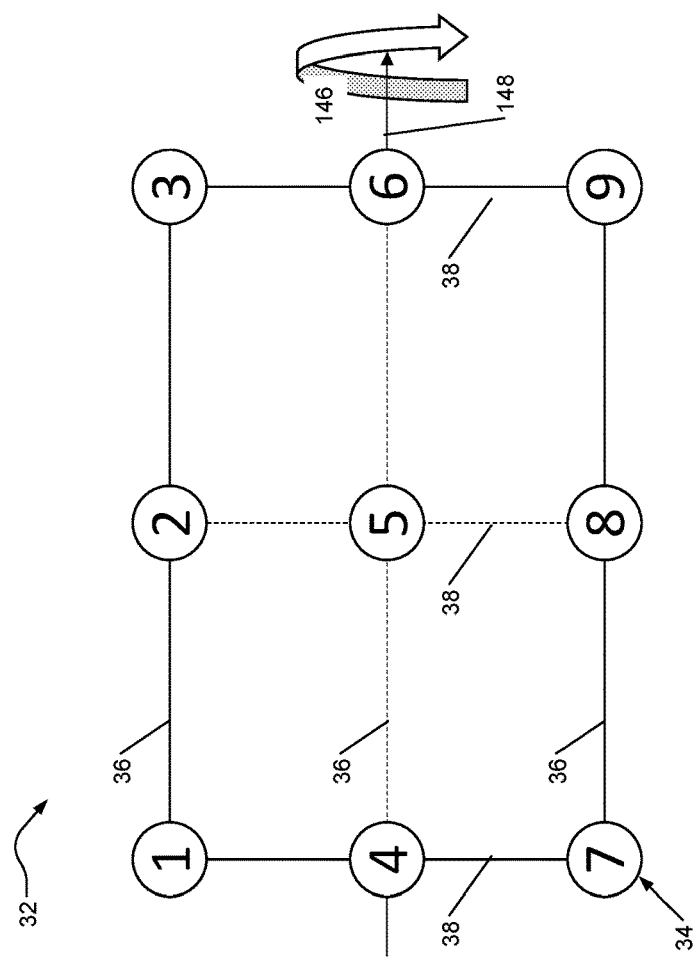
FIG. 15 is a planar view of the camera fixture illustrating another axis about which the camera fixture may be rotated.

In another example, referring briefly to FIGS. 15 and 16, the camera fixture 32 may be rotated by an angle 146 about an axis 148 extending through the cameras 4, 5, 6 and disposed within the plane of the camera array 34 due to imprecise alignment of the camera fixture/array 32/34 as shown in FIG. 15. In addition, if the camera fixture 32 is rotated by the angle 146 about the axis 148 and still aims the center camera 5 at the physical target 90, the camera fixture 32 will also be rotated by the angle 146 about an axis extending through the center camera 5 and disposed within the plane of the camera array 34 as shown in FIG. 16. The camera misalignment module 44 may determine the angle 146 based on the size and/or shape of the physical target 90 in one or more of the images captured by the cameras in the camera array 34. As a result of the angular misalignment of the camera fixture 32 shown in FIGS. 15 and 16, the images captured by the cameras 1, 2, 3 have an opposite depth change relative to the images captured by the cameras 7, 8, 9. In addition, a target size change in the vertical direction y of the image captured by the center camera 5 is equal to $$(\text{target size }y(m) * \cos\varphi_x) * \frac{N}{2D\tan\theta_y}, \quad (7)$$

where $\varphi_x$ is the angle 146.

Referring again to FIG. 3, at 66, the HUD control module 40 controls the HUD 20 to display the virtual target 150 at the target location of images projected by the HUD 20 (e.g., at the HUD patch 24). At 68, the camera control module 42 controls each camera in the camera array 34 to capture an image of the virtual target 150. For example, if the camera array 34 includes nine cameras as shown in FIGS. 1 and 7, the camera array 34 captures nine images of the virtual target 150, with each camera in the camera array 34 capturing one of the nine images.

Figure 18:
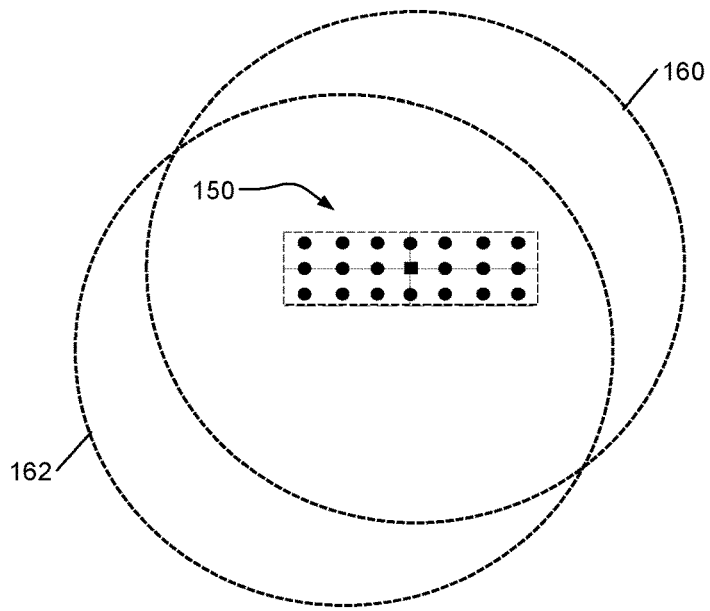
FIG. 18 is a planar view of images of the virtual target captured by the lower right camera and the center camera of the camera array.

FIG. 18 shows examples of an image 160 of the virtual target 150 captured by the center camera 5 and an image 162 of the virtual target 150 captured by the lower right camera 9. Since the center camera 5 is aligned with the HUD patch 24 and the HUD 20 displays the virtual target 150 in the HUD patch 24, the center square 156 of the virtual target 150 appears at the center of the image 160 captured by the center camera 5. Since the lower right camera 9 is located below and to the right of the center camera 5, the center square 156 of the virtual target 150 appears in the upper right quadrant of the image 162 captured by the lower right camera 9.

Figure 19:
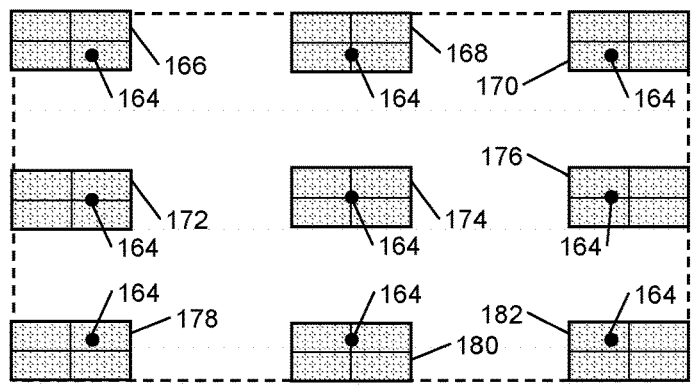
FIG. 19 is a planar view of images of the virtual target captured by all of the cameras in the camera array.

FIG. 19 shows example images of a point 164 on the virtual target 150, such as the center square 156, captured by the cameras in the camera array 134. The images shown in FIG. 19 include an image 166 captured by the upper left camera 1, an image 168 captured by the upper middle camera 2, an image 170 captured by the upper right camera 3, an image 172 captured by the middle left camera 4, an image 174 captured by the center camera 5, an image 176 captured by the middle right camera 6, an image 178 captured by the lower left camera 7, an image 180 captured by the lower middle camera 8, and an image 182 captured by the lower right camera 9. FIG. 19 illustrates the horizontal and vertical offsets between the pixel location of the point 164 in the image 174 captured by the center camera 5 and the pixel locations of the point 164 in the images 166, 168, 170, 172, 176, 178, 180, 182 captured by the other cameras in the camera array 34.

Referring again to FIG. 3, at 70, the HUD misalignment module 46 determines a target location of the virtual target 150 in each image captured by the cameras in the camera array 34. The target location of the virtual target 150 in each image may be determined based on the horizontal and vertical misalignment of the respective camera. The target location of the virtual target 150 in each image may be also be determined based on the relationships between the coordinate of a point in the image captured by the center camera 5 and the coordinate of the same point in the image captured by each of the other cameras in the camera array 34.

In one example, the target location of the center square 156 of the virtual target 150 is at a coordinate $(\Delta x_5, \Delta y_5)$ in the image captured by the center camera 5, where $\Delta x_5$ and $\Delta y_5$ represent the horizontal and vertical misalignment of the center camera 5. In other words, $\Delta x_5$ and $\Delta y_5$ are the horizontal and vertical distances between the actual and target locations of the physical target 90 in the image captured by the center camera 5. In addition, the target location of the center square 156 of the virtual target in the image captured by each of the other cameras in the camera array 34 may be determined based on (1) the relationships between points in the images of the other cameras and points in the image of the center camera 5 and (2) the horizontal and vertical misalignment of the other cameras. For example, the target location of the center square 156 in the image captured by the upper left camera 1 is at a coordinate $$\left(\frac{dx}{2D\tan\theta_x}M + \Delta x_1, \frac{-dy}{2D\tan\theta_y}N + \Delta y_1\right),$$

where $\Delta x_1$ and $\Delta y_1$ represent the horizontal and vertical image misalignment between target and actual locations of points appearing on the image of the upper left camera 1.

In various implementations, the HUD misalignment module 46 may adjust the images of the virtual target 150 captured by the cameras in the camera array 34 based on the horizontal and vertical misalignment of the respective camera. For example, the HUD misalignment module 46 may process the images of the virtual target 150 to remove the misalignment of the camera fixture/array 32/34. In these implementations, the HUD misalignment module 46 may account for the fact that each image has already been adjusted to remove the camera/fixture misalignment when determining the target location of the virtual target 150 in each image.

At 72, the HUD misalignment module 46 determines horizontal and vertical offsets $\Delta x$ and $\Delta y$ between the actual and target locations of one or more points on the virtual target 150 in the images captured by the cameras in the camera array 34. The offsets $\Delta x$, $\Delta y$ represent the horizontal and vertical misalignment of the images projected by the HUD 20. In one example, for each camera in the camera array 34, the HUD misalignment module 46 determines the offsets $\Delta x$, $\Delta y$ between the actual and target locations of the center square 156 in the image of the virtual target 150 captured by the respective camera. The HUD misalignment module 46 may determine the average value of all of the offsets $\Delta x$ and the average value of all of the offsets $\Delta y$ to obtain offsets $\Delta x_{avg}$, $\Delta y_{avg}$ representing the horizontal and vertical misalignment of the images projected by the HUD 20.

At 74, the HUD control module 40 adjusts the location of the image projected by the HUD 20 to align the center of the HUD image with the center of the images captured by the cameras in the camera array 34. The HUD control module 40 may adjust the horizontal and vertical locations of the HUD image by negative values of the offsets $\Delta x$, $\Delta y$ between the actual and target locations of the virtual target 150 in the images captured by the cameras. For example, if the horizontal and vertical misalignment of the HUD image is represented by the offsets $\Delta x_{avg}$, $\Delta y_{avg}$, the HUD control module 40 may adjust the horizontal and vertical locations of the HUD image by $-\Delta x_{avg}$ and $-\Delta y_{avg}$, respectively. Aligning the center of the HUD image with the center of the camera images ensures that the HUD image is in the HUD patch 24.

At 76, the camera control module 42 controls each camera in the camera array 34 to capture an image of the virtual target 150 projected by the HUD 20 after the center of the HUD image has been aligned with the center of the camera images. At 78, the HUD control module 40 determines distortion compensation map(s) characterizing the distortion of the images projected by the HUD 20. For example, for each camera in the camera array, the HUD control module 40 may determine the offsets $\Delta x$, $\Delta y$ between actual and target locations of each circular dot 158 in the image captured by the respective camera. Then, based on the offsets $\Delta x$, $\Delta y$ of the circular dots 158, the HUD control module 40 may determine compensation values for use in adjusting the distortion of the HUD image to eliminate the offsets $\Delta x$, $\Delta y$. The compensation values collectively comprise the compensation map(s).

At 80, the HUD control module 40 adjusts the distortion of the image projected by the HUD 20 using the distortion compensation map(s). For example, the HUD control module 40 may multiple a target location of each point in the HUD image by a corresponding one of the compensation values to obtain a new target location, and project the respective point at the new target location. For points in the HUD image that do not correspond to one of the compensation values, the HUD control module 40 may use interpolation between two or more of the compensation values to determine new compensation values for those points.

At 82, the camera control module 42 controls each camera in the camera array 34 to capture a new image of the virtual target 150 to validate the distortion compensation map(s). During the validation, the HUD control module 40 may again determine the offsets Δx, Δy between actual and target locations of each circular dot 158 in the image captured by each camera in the camera array 34. If each offset Δx, Δy is less than a predetermined value, the HUD control module 40 may validate the distortion compensation map(s). Otherwise, the HUD control module 40 may not validate the distortion compensation map(s). The method ends at 84.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A method for adjusting a location of an image projected onto a windshield of a vehicle by a head-up display (HUD), the method comprising:
placing a physical target on the windshield at a target location of the projected image;
mounting a fixture to a component within a cabin of the vehicle to position an array of cameras attached to the fixture within a possible line of sight between eyes of a passenger of the vehicle and the target location of the projected image;
capturing a first plurality of images of the physical target using the array of cameras;
determining at least one difference between an actual location of the physical target in each of the first plurality of images and a target location of the physical target in each of the first plurality of images;
controlling the HUD to display a virtual target on the windshield at the target location of the projected image;
capturing a second plurality of images of the virtual target using the array of cameras;
determining a target location of the virtual target in each of the second plurality of images based on the at least one difference;
determining at least one offset between an actual location of the virtual target in each of the second plurality of images and the target location of the virtual target in each of the second plurality of images; and
adjusting the location of the image projected onto the windshield by the HUD based on the at least one offset.

2. The method of claim 1 further comprising positioning a camera at a center of the array of cameras so that the physical target in an image captured by the camera is positioned at the target location of the physical target in the captured image.

3. The method of claim 1 wherein the at least one difference includes a distance between a center of the physical target in each of the first plurality of images and a center of a corresponding image of the first plurality of images.

4. The method of claim 3 wherein the at least one difference incudes the distance in two directions that are perpendicular to one another.

5. The method of claim 1 further comprising:
determining at least one angle between an actual orientation of the fixture and a target orientation of the fixture; and
determining the target location of the virtual target in each of the second plurality of images further based on the at least one angle.

6. The method of claim 5 wherein the at least one angle includes an angle by which the fixture is rotated about an axis that extends through a center camera of the array of cameras and is perpendicular to a plane in which the array of cameras is disposed.

7. The method of claim 5 wherein the at least one angle includes an angle by which the fixture is rotated about an axis that extends through at least two cameras of the array of cameras and is disposed within a plane in which the array of cameras is disposed.

8. The method of claim 7 wherein the axis is parallel to at least one side of the fixture.

9. The method of claim 1 wherein the at least one offset includes a distance between a center of the virtual target in each of the second plurality of images and a center of a corresponding image of the second plurality of images.

10. The method of claim 9 wherein the at least one offset includes the distance in two directions that are perpendicular to one another.

11. The method of claim 1 further comprising:
determining a target location of a center of the virtual target in each of the second plurality of images based on the at least one difference; and
adjusting the location of the image projected by the HUD based on the at least one offset so that an actual location of the center of the virtual target in each of the second plurality of images is at the target location of the center of the virtual target.

12. The method of claim 1 wherein each camera in the array of cameras captures one image in the first plurality of images and one image in the second plurality of images.

13. A method for adjusting a location of an image projected onto a windshield of a vehicle by a head-up display (HUD), the method comprising:
placing a physical target on the windshield at a target location of the projected image;
mounting a fixture to at least one of a steering wheel and a steering column to position an array of cameras on the fixture within a possible line of sight between eyes of a driver of the vehicle and the target location of the projected image, wherein one camera in the array of cameras is located at a center of the array of cameras;
positioning the one camera so that an actual location of the physical target in an image captured by the one camera is at a target location of the physical target in the captured image;
capturing a first plurality of images of the physical target using the array of cameras;
determining a first distance between the actual location of the physical target in each of the first plurality of images and the target location of the physical target in each of the first plurality of images, wherein the first distance is in a first direction;
determining a second distance between the actual location of the physical target in each of the first plurality of images and the target location of the physical target in each of the first plurality of images, wherein the second distance is in a second direction that is perpendicular to the first direction;
controlling the HUD to display a virtual target on the windshield at the target location of the projected image;
capturing a second plurality of images of the virtual target using the array of cameras;

determining a target location of the virtual target in each of the second plurality of images based on the first and second distances;

determining a first offset between an actual location of the virtual target in each of the second plurality of images and the target location of the virtual target in each of the second plurality of images, wherein the first offset is in the first direction;

determining a second offset between the actual location of the virtual target in each of the second plurality of images and the target location of the virtual target in each of the second plurality of images, wherein the second offset is in the second direction; and adjusting the location of the image projected onto the windshield by the HUD based on the first and second offsets.

14. The method of claim 13 further comprising:

determining a first angle by which the fixture is rotated about an axis that extends through a center camera of the array of cameras and is perpendicular to a plane in which the array of cameras is disposed;

determining a second angle by which the fixture is rotated about an axis that extends through at least two cameras of the array of cameras and is disposed within the plane in which the array of cameras is disposed; and determining the target location of the virtual target in each of the second plurality of images further based on first and second angles.

15. A system for adjusting a location of an image projected onto a windshield of a vehicle by a head-up display (HUD), the system comprising:

a camera control module configured to:
control an array of cameras disposed within a cabin of the vehicle to capture a first plurality of images of a physical target placed on the windshield at a target location of the projected image; and
control the array of cameras to capture a second plurality of images of a virtual target displayed on the windshield using the array of cameras;

a camera misalignment module configured to determine at least one difference between an actual location of the physical target in each of the first plurality of images and a target location of the physical target in each of the first plurality of images;

a HUD misalignment module configured to:
determine a target location of the virtual target in each of the second plurality of images based on the at least one difference; and
determine at least one offset between an actual location of the virtual target in each of the second plurality of images and the target location of the virtual target in each of the second plurality of images; and a HUD control module configured to:
control the HUD to display the virtual target on the windshield at the target location of the projected image; and
adjust the location of the image projected onto the windshield by the HUD based on the at least one offset.

16. The system of claim 15 further comprising:
the array of cameras; and
a fixture to which the array of cameras is attached, wherein the fixture is configured to be mounted to a component of the vehicle within the cabin to position the array of cameras within a possible line of sight between eyes of a passenger of the vehicle and the target location of the projected image on the windshield.

17. The system of claim 15 wherein the at least one difference includes a distance between a center of the physical target in each of the first plurality of images and a center of a corresponding image of the first plurality of images.

18. The system of claim 15 wherein:
the camera misalignment module is configured to determine at least one angle between an actual orientation of the array of cameras and a target orientation of the array of cameras; and
the HUD misalignment module is configured to determine the target location of the virtual target in each of the second plurality of images based on the at least one angle.

19. The system of claim 15 wherein the at least one offset includes a distance between a center of the virtual target in each of the second plurality of images and a center of a corresponding image of the second plurality of images.

20. The system of claim 15 wherein the HUD control module is configured to:
determine a target location of a center of the virtual target in each of the second plurality of images based on the at least one difference; and
adjust the location of the image projected by the HUD based on the at least one offset so that an actual location of the center of the virtual target in each of the second plurality of images is at the target location of the center of the virtual target.

* * * * *